Figure 1:
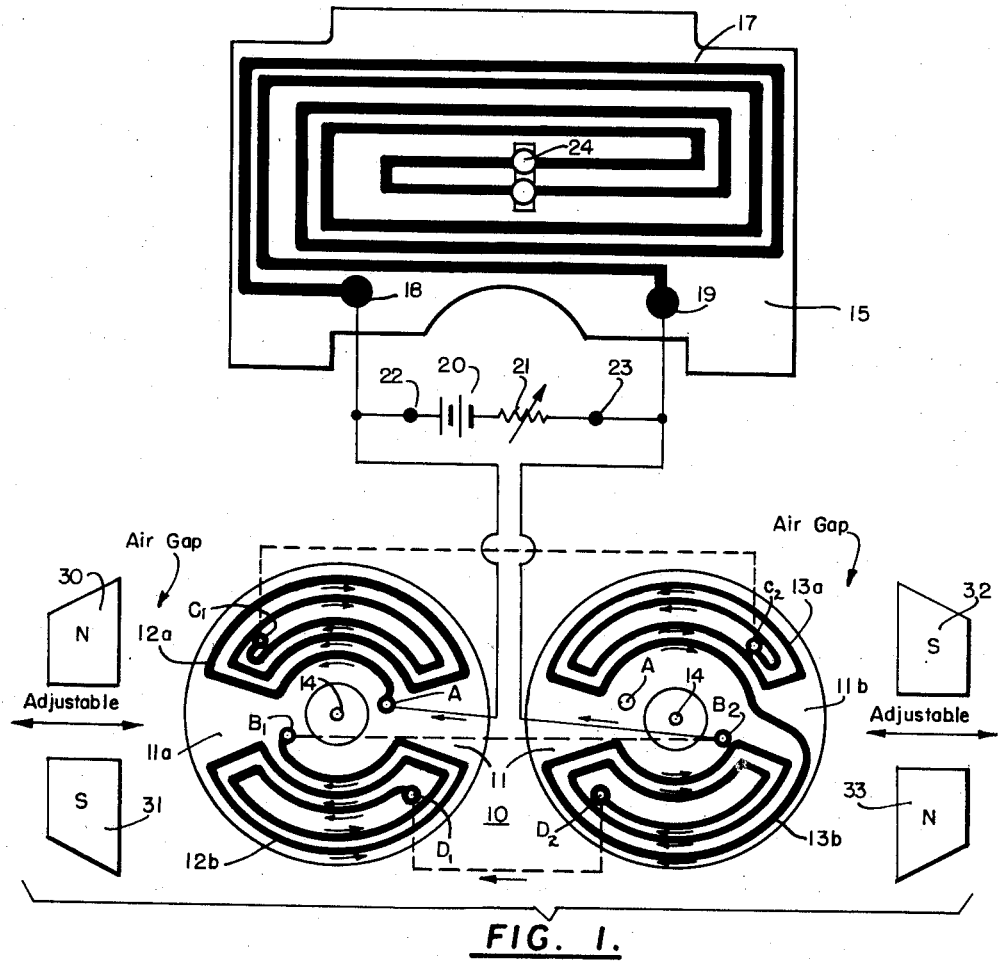

July 12, 1960

L. W. PARKER 2,945,180

SHUNTS FOR PRINTED CIRCUIT METERS

Filed April 17, 1957

INVENTOR

Louis W. Parker

BY

ATTORNEYS

United States Patent Office 2,945,180
Patented July 12, 1960

2,945,180

SHUNTS FOR PRINTED CIRCUIT METERS

Louis W. Parker, 130 Cutter Mill Road, Great Neck, N.Y.

Filed Apr. 17, 1957, Ser. No. 653,469

7 Claims. (Cl. 324—126)

The present invention relates to electrical indicating instruments of the types employing printed circuit coils in the provision of meter movements; and is more particularly concerned with an improved shunt structure adapted for use in such printed circuit meters to vary the sensitivity of the meter.

In my prior U.S. Patent No. 2,773,239, issued December 4, 1956, for "Electrical Indicating Instruments," I have described an improved measuring instrument comprising a printed circuit meter movement. This meter movement may take various configurations; and in the particular form of the invention set forth in my said prior Patent No. 2,773,239, this meter movement includes a printed circuit of coil configuration carried on opposed sides of a metallic disk. The actual construction of a typical such movement will be described subsequently, and is described in considerable detail in my Patent No. 2,773,239 which is incorporated herein by reference.

Printed circuit coils generally of the types contemplated in my prior patent find particular utility in meter movements; but it has been found that the printed circuit coils comprising the meter movement have the disadvantage of exhibiting comparatively high resistance. This is due mainly to the fact that during the etching of the thin lines comprising the printed circuit coils, the thickness of the metal etched away must be less than the remaining line width of metal, for otherwise the etching fluid may eat under the remaining metal of the printed circuit and thereby loosen the bond between that remaining metal and the insulating base supporting the printed circuit coil. Accordingly, in providing printed circuit coils, generally of the type described in my prior Patent No. 2,773,-239, and particularly in providing such coils with a relatively large number of turns, the etched metal is intentionally made very thin, whereby the resulting coil has comparatively high resistance.

In conventional meter movements, it is often desired to provide means for changing the sensitivity of the meter, whereby a single meter may be caused to measure various current ranges. A typical such structure employed heretofore often takes the form of a shunt resistance connected across the meter terminals and serving to bypass a precise percentage of the current normally passing through the meter; and these shunts are in turn normally calibrated so that by employing different shunts the sensitivity and measurement range of the meter is changed as desired. This shunt structure is also normally associated in conventional meters with another resistance placed in series with the meter coil itself whereby this latter series resistance can be employed to partially compensate the meter for changes in resistance due to temperature variations.

However, in the case of a printed circuit meter of the types described previously, and particularly of the types described in my Patent No. 2,773,239, the inherently high resistance of the printed circuit meter coil makes it relatively undesirable to add a further compensating resistance in series therewith; and as a result, changes in sensitivity of the instrument would normally be accomplished by the use of a shunt alone. Moreover, inasmuch as shunts of the types suggested heretofore are ordinarily made of low temperature coefficient materials, the ratio of the shunt resistance to the resistance of the meter coil may vary enough with changes in temperature to introduce substantial errors in the reading of the instrument.

As will be described subsequently, printed circuit meter movements of the types preferably utilized in conjunction with the present invention, normally comprise a printed circuit of copper; and the aforementioned variation in the ratio of meter resistance to shunt resistance may be compensated for the most part by employing a copper shunt so that both the meter coil and shunt exhibit the same temperature coefficient. In practice, however, it has been found that a shunt wound of copper wire, and adapted for use with a printed circuit meter of the type contemplated by the present invention, requires a comparatively long length of copper wire due to the inherently low resistance of copper, whereby the completed shunt assembly ordinarily has a substantially larger mass than the meter coil itself. This requirement of a relatively larger mass of copper wire in the provision of shunts for use in printed circuit meters again makes it fairly difficult to maintain a constant ratio of meter resistance to shunt resistance for changes in temperature, since the larger shunt mass tends to take longer to reach a new temperature than does the smaller and more exposed moving coil of the meter; and since, further, the larger shunt mass tends to have a smaller surface-to-mass ratio than that of the meter coil. As a result of these several features of printed circuit meters suggested heretofore, it has been found relatively difficult to provide proper shunts for changing the sensitivity of printed circuit meters.

The present invention is particularly directed toward obviating the foregoing difficulties as well as toward obviating other disadvantages of conventional shunts, and relates particularly to an improved shunt structure adapted for use in meter devices, and more particularly adapted for use in printed circuit meters.

It is accordingly an object of the present invention to provide an improved shunt structure for use in electrical indicating instruments.

Another object of the present invention resides in the provision of a printed circuit meter shunt.

A still further object of the present invention resides in the provision of a printed circuit electrical indicating instrument in combination with improved means for readily changing the sensitivity of the said instrument.

Still another object of the present invention resides in the provision of a printed circuit shunt associated with an indicating scale whereby selection of a desired meter scale for measuring current in a selected range automatically provides the necessary meter shunt for varying the sensitivity of the meter to permit measurements in said selected range.

A still further object of the present invention resides in the provision of a shunt structure so constructed that its mass-to-surface ratio and materials approximate the mass-to-surface ratio and materials of the meter movement, thereby to reduce possible errors due to thermal inertia.

A still further object of the present invention resides in the provision of an improved shunt and meter structure, the sensitivity of which can be readily adjusted to compensate for resistance errors in the shunt, or in the meter coil itself.

In providing for the foregoing objects and advantages, the present invention contemplates the provision of a shunt structure taking the form of a supporting surface having a printed circuit shunt resistance pattern on one face thereof and a meter scale on the other face thereof. The actual supporting surface and shunt structure is so constructed as to materials and configuration that it approximates the material and configuration of the meter coil itself, thereby to reduce possible errors due to temperature variation adjacent the shunted meter. It will be appreciated that the more nearly the size and materials of the shunt and meter rotor approximate each other, the closer will be the thermal inertia and temperature coefficient of the two units, whereby less error will be introduced by changes in ambient temperature. The present invention, by recognizing this particular concept, permits and provides a shunt construction which does in fact approximate, for both the meter coil and shunt, the same order of magnitude of microwatts of energy per square inch radiated as heat.

In accordance with a further feature of the present invention, the shunt itself is, as mentioned previously, associated with a supporting structure carrying a meter scale thereon; and in practice the resistivity of the shunt is directly related to the meter scale associated therewith. By this arrangement, therefore, the sensitivity of the meter may be readily changed by merely removing one meter scale and replacing it with another; and this replacement of meter scale, to measure current in a desired current range, automatically results in the selection and installation of the proper shunt necessary to permit measurements in said desired current range.

Figure 2:
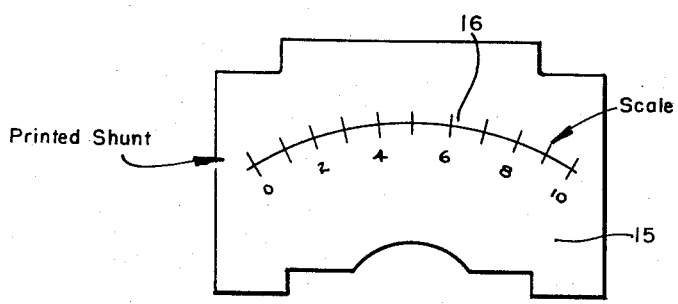

The foregoing objects, advantages, construction and operation of the present invention will become more readily apparent from the following description and accompanying drawings, in which:

Figure 1 illustrates an improved shunt and measuring instrument constructed in accordance with the present invention; and Figure 2 is a view of the meter scale on the opposite side of the shunt structure illustrated in Figure 1.

Thus, referring to the drawings, it will be seen that an improved meter constructed in accordance with the present invention may comprise a rotor 10 taking the form of a disk 11 having opposed sides 11a and 11b. The said disk 11 may be formed of an aluminum alloy; and the two opposed sides 11a and 11b thereof carry printed circuit coils 12a—12b and 13a—13b, respectively. This actual construction is described in my aforementioned prior Patent No. 2,773,239; and in practice the overall construction comprising disk 11 may be formed by initially anodizing the exterior surface of the aluminum or aluminum alloy disk 11, thereby to form a thin coating of insulating aluminum oxide on the opposed sides of disk 11. A thin sheet of conductive material such as copper may thereafter be cemented onto the aforementioned aluminum oxide insulating layer and a photo-etching technique may then be employed to etch away chemically portions of this copper layer thereby to leave the printed copper coils, designated 12a—12b and 13a—13b, on the opposed sides of the disk or rotor 11. The resulting structure, therefore, comprises a rotor or disk of aluminum having printed coils on both sides thereof, with these printed coils being insulated from the aluminum disk through the agency of a very thin insulating coating of aluminum oxide.

When used in a meter, the coil points designated B1 and B2 as well as those designated C1 and C2, and D1 and D2, on opposed sides of the disk, are interconnected by conductive deposits passing through disk 11; and in addition, the disk 11 may be mounted for rotation between appropriate pole pieces 30 through 33 inclusive, on pivot point 14, whereafter a current to be measured can be applied between the points A and B2 on opposed sides of the disk, through appropriate hair springs (not shown).

A number of significant structural and operational advantages are exhibited by this resulting structure, and these advantages are described in detail in my prior patent. One of the disadvantages of the structure, however, is that the printed coils 12a—12b and 13a—13b must, by their very nature, be very thin whereby the resultant coils exhibit a relatively high resistance thereby making it impractical to shunt the circuit by conventional shunts when it is desired to change the sensitivity or measurement range of the instrument.

In accordance with the present invention, however, printed circuit rotors of the type thus far described, may be shunted by an improved shunt structure, also taking a printed circuit configuration, and this shunt structure approximates the structure and materials of rotor 10 itself. By thus providing a shunt which is of approximately the same structure and materials as the rotor 10 itself, temperature changes adjacent the resulting shunted meter will affect the electrical characteristics of shunt and rotor in like manners. Accordingly, by using the improved shunt of the present invention, the selected sensitivity and calibration of the instrument will remain substantially at a constant preselected value without the need of a separate calibrating resistance connected in series with the high resistance meter coils.

In particular, the improved shunt of the present invention comprises a thin sheet of metal 15, preferably formed of the same material as disk 11 and preferably having a mass and thickness similar to that of disk 11. Where aluminum or an aluminum alloy is chosen in the provision of disk 11, plate 15 is similarly preferably of aluminum or aluminum alloy.

The plate 15 can, in accordance with one feature of the present invention, have an instrument scale on one side thereof, and such a scale has been designated 16 in Figure 2. It will be appreciated that Figure 2 actually illustrates the reverse side of the shunt structure shown in Figure 1, whereby the meter scale and printed shunt appear respectively on opposed sides of plate 15. The shunt itself comprises a non-inductive pattern 17 printed on one side of plate 15, with the opposed ends of the said non-inductive pattern 17 being brought out to terminals 18 and 19 respectively. In the particular arrangement shown in Figure 1, printed resistance pattern 17 approximates that of a printed bifilar coil, but it will be understood that there may be variations in the precise pattern employed without departing from the principles of the present invention.

The printed shunt pattern 17 may be formed by a technique similar to that described in reference to rotor 10; and in particular, the said aluminum plate 15 may be anodized whereafter a copper sheet is cemented to the resulting non-conductive surface; and the shunt pattern 17 is thereafter formed by a photo-etching process. As a result of the techniques described above, therefore, the shunt provided by the present invention approximates both the structure and material of the printed coils 12a—12b and 13a—13b, as well as of the disk 11 supporting those coils. By reason of this construction, the thermal inertia and temperature coefficient of the shunt and rotor units are close to one another whereby little if any error, due to changes in ambient temperature, will be introduced into the shunted meter.

In accordance with a particular feature of the present invention, the resistance of printed shunt pattern 17, comprising a meter shunt in accordance with the present invention, is related to the scale 16 appearing on the opposed side of its supporting plate 15; and a plurality of such scales may be provided for use with a basic instrument of the type described in my prior Patent No. 2,773,239, whereby the sensitivity of the instrument may be automatically altered as desired by merely selecting an appropriate scale having a corresponding shunt thereon; and by thereafter interconnecting that scale and shunt into the meter. When so interconnected a current source, comprising for instance battery 20 and variable resistance 21, may be coupled to terminals 22 and 23 comprising connections to the aforementioned hair springs feeding points A and B2 on opposed sides of disk 11; and the points 22 and 23 would similarly be connected to terminals 18 and 19 of shunt 17. As a result of this connection therefore a selected percentage of the current provided by source 20—21 will be shunted away from meter coils 12a—12b and 13a—13b on disk 11, and will pass through the shunt resistance pattern 17, thereby to alter the sensitivity of the shunted instrument in a desired manner.

It should be noted that the resistance of the shunt illustrated in Figure 1 can be adjusted to a lower value after manufacture has been completed by short-circuiting a portion of the said shunt. Such a short-circuit is illustrated by the conductive deposit 24 illustrated in Figure 1; and a manufacturer may, by utilizing such a deposit 24, readily manufacture shunts having an approximate resistance value, whereafter the shunt may be calibrated to a precisely desired value by placing a deposit 24 at an appropriate location relative to the adjacent deposits comprising the shunt resistance pattern 17.

Another very convenient way to vary the resistance of the shunt comprises connecting an ohmmeter to the shunt during etching. As the etching process progresses the resistance increases, and when it has reached the desired value, the etching is stopped by removing the shunt from the etching solution and placing it in water. Similarly, additional copper may be deposited onto the shunt resistance in order to reduce its resistance. This plating process can also be employed with an ohmmeter connected to the shunt to observe the amount of plating required.

It should also be noted that shunts, such as 17, may have, if desired, a slightly incorrect resistance value; in which event the sensitivity of the instrument utilizing that shunt can be adjusted slightly or varied, as desired, to effect substantially perfect calibration of the overall instrument. Such variation of sensitivity in the instrument is ordinarily accomplished by adjusting the air gap between the pole pieces and meter coil in the instrument; and in this respect attention is again invited to my prior Patent No. 2,773,239 and particularly to Figure 6 thereof, whereby it will be seen that, by varying the spacing of the pole pieces relative to the meter coil rotary disk, the sensitivity of the instrument can be changed somewhat.

This possibility of adjusting the sensitivity of the instrument by adjusting the air gap between the pole pieces and rotor of the instrument comprises a further feature of the present invention since it permits the use of shunts constructed in accordance with the present invention even though said shunts should have a slightly incorrect resistance value, provided the shunt error is within the adjustment range of the basic instrument. This latter feature of the present invention permits a shunt to be connected to an instrument of the type described in my Patent No. 2,773,239, whereafter the overall instrument can be empirically adjusted by varying the air gap between pole pieces 30—33 and rotor disk 11, thereby to accurately calibrate the instrument. This procedure is in fact often highly desirable inasmuch as the error in resistance of the shunted meter coil may not in fact comprise an error in the shunt, but may be an error in the meter coil itself. In this latter event, the error in the meter coil may remain unrecognized until the shunt is actually connected to the meter; and the empirical pole piece adjustment technique described previously thus permits an accurately calibrated instrument to be effected so long as the instrument sensitivity can be changed within a desired range by air gap adjustment. As a matter of actual practice, it has been found that in a 10-milliampere instrument a possible variation of approximately 1 milliampere plus or minus, is such a permissible range.

While I have thus described a preferred embodiment of the present invention, many variations will be suggested to those skilled in the art. It must therefore be understood that the foregoing description is meant to be illustrative only and should not be considered limitative of my invention; and all such modifications and variations which are in accord with the principles described, are meant to fall within the scope of the appended claims.

Having thus described my invention, I claim:

1. In combination, a measuring instrument comprising a rotor having a printed circuit meter coil thereon, means for varying the sensitivity of said instrument comprising a shunt including a printed circuit shunt resistance of substantially the same material as said meter coil, said shunt having a mass-to-surface ratio approximating the mass-to-surface ratio of said rotor whereby said shunt and rotor have respective thermal inertias in the same order of magnitude, and means for connecting said printed circuit meter coil and said printed circuit shunt resistance in parallel with one another.

2. The combination of claim 1 wherein said rotor comprises a first metallic supporting member having a first insulating layer thereon, said printed circuit meter coil comprising a printed metallic coil supported on said first insulating layer adjacent a surface of said first metallic supporting member, said shunt comprising a second metallic supporting member having a second insulating layer thereon, said printed circuit shunt resistance comprising a printed metallic pattern supported on said second insulating layer adjacent a surface of said second metallic supporting member, said first and second supporting members being formed of a first similar metal, and said printed circuit meter and shunt coils being formed of a second similar metal different from said first metal.

3. In combination, a measuring instrument comprising a plurality of pole pieces, a rotor mounted for rotation between said pole pieces, said rotor including a thin metallic supporting member having printed circuit coil means thereon, a pair of terminals coupled to said meter coil means, means for applying a current to be measured to said meter coil means via said terminals, and means for controlling the sensitivity of said instrument by bypassing a portion of said current away from said meter terminals comprising a shunt connected to said terminals in parallel with said meter coil, said shunt comprising a thin plate of metal having an insulating layer on a surface thereof, a printed metallic shunt resistance supported by said plate of metal and spaced therefrom by said insulating layer, the opposed ends of said printed circuit shunt resistance being connected to said meter terminals, said shunt including said thin plate of metal having substantially the same ratio of mass-to-surface as said rotor including said thin metallic supporting member.

4. The combination of claim 3 wherein said printed metallic shunt resistance comprises a coil having a non-inductive configuration.

5. In combination, a meter comprising a plurality of pole pieces, an aluminum supporting member mounted for rotary motion between said pole pieces, said aluminum supporting member having an anodized surface and also having a printed meter coil of copper on said anodized surface disposed between said pole pieces, means for connecting said printed meter coil to a source of current to be measured, a further stationary supporting member of aluminum, said further stationary supporting member having a thickness in the same order of magnitude as that of said first mentioned rotary supporting member, said further stationary supporting member having an anodized surface and also having a printed shunt resistance of copper thereon, and means for removably connecting said printed shunt resistance in parallel with said printed meter coil thereby to bypass a portion of the current from said source away from said meter coil, said first mentioned and further aluminum supporting members respectively having mass-to-surface ratios in the same order of magnitude.

6. In a meter of the type comprising a rotor of thin metallic configuration having printed circuit meter coil means thereon, a shunt structure adapted to be connected electrically across said meter coil means thereby to change the operating range of said meter, said shunt structure comprising a thin metallic plate having a printed circuit resistance thereon, the mass-to-surface ratio of said thin metallic plate and printed circuit resistance being of the same order of magnitude as the mass-to-surface ratio of said thin metallic rotor having said meter coil means thereon, whereby the thermal inertia of said rotor approximates the thermal inertia of said shunt structure.

7. The combination of claim 6 wherein said thin metallic plate comprises the same material as said thin metallic rotor, said printed circuit resistance comprising the same material as said printed circuit meter coil means.

References Cited in the file of this patent
UNITED STATES PATENTS

| | | |
|---|---|---|
| 606,171 | Shallenberger | June 21, 1898 |
| 2,466,558 | Sadlon | Apr. 5, 1949 |
| 2,640,092 | Fett | May 26, 1953 |
| 2,673,957 | Rozett | Mar. 30, 1954 |
| 2,692,190 | Pritikin | Oct. 19, 1954 |
| 2,699,424 | Nieter | Jan. 11, 1955 |
| 2,739,881 | Kepple | Mar. 27, 1956 |
| 2,773,239 | Parker | Dec. 4, 1956 |
| 2,777,930 | Nathanson | Jan. 15, 1957 |
| 2,783,193 | Nieter | Feb. 26, 1957 |